United States Patent [19]
Lee

[11] 4,289,035
[45] Sep. 15, 1981

[54] COMPENSATED CAPACITIVE TRANSDUCER DEMODULATOR CIRCUIT

[75] Inventor: Chen Y. Lee, Troy, Mich.

[73] Assignee: The Bendix Corporation, Southfield, Mich.

[21] Appl. No.: 965,453

[22] Filed: Nov. 30, 1978

Related U.S. Application Data

[63] Continuation of Ser. No. 878,056, Feb. 15, 1978, abandoned.

[51] Int. Cl.³ .......................................... G01L 19/04
[52] U.S. Cl. ..................................... 73/708; 73/718; 73/724; 73/766
[58] Field of Search ................ 73/708, 718, 724, 765, 73/766; 324/10 J, 61 R

[56] References Cited

U.S. PATENT DOCUMENTS

| | | | |
|---|---|---|---|
| 2,920,298 | 1/1960 | Hines | 73/766 |
| 3,161,821 | 12/1964 | Price et al. | 73/766 |
| 3,271,669 | 9/1966 | Lode | 324/60 R |
| 3,318,153 | 5/1967 | Lode | 73/718 |
| 3,387,206 | 6/1968 | Sampson | 73/362 R |
| 3,545,275 | 12/1970 | Harrison et al. | 73/753 |
| 3,673,435 | 6/1972 | Stanley | 307/321 |
| 3,742,347 | 6/1973 | Walton | 73/718 |
| 3,808,480 | 4/1974 | Johnston | 73/718 |
| 3,848,180 | 11/1974 | Jonke et al. | 73/728 |
| 3,869,676 | 3/1975 | Harrison et al. | 307/321 |
| 3,883,812 | 5/1975 | Harrison et al. | 307/321 |
| 3,948,102 | 4/1976 | Coon | 73/724 |
| 4,040,118 | 8/1977 | Johnston | 73/718 |

OTHER PUBLICATIONS

"A Diode–Quad Bridge Circuit for Use with Capacitance Transducers," by Harrison et al. Rev. Scientific Instrum., vol. 44, No. 10, Oct. 1973.

*Primary Examiner*—Donald O. Woodiel
*Attorney, Agent, or Firm*—William A. Marvin; Russel C. Wells

[57] ABSTRACT

A compensation technique and network circuitry for a quad-diode demodulator and capacitive transducer combination is disclosed. The compensation method includes varying the amplitude of an alternating carrier frequency oppositely to the changes produced in that amplitude by the compensable errors in the demodulator and transducer. In one preferred embodiment ratiometric compensation and temperature compensation for the demodulator and any capacitive transducer is produced. In a second embodiment linearization and temperature compensation for the demodulator and a quartz capacitive transducer is provided.

21 Claims, 16 Drawing Figures

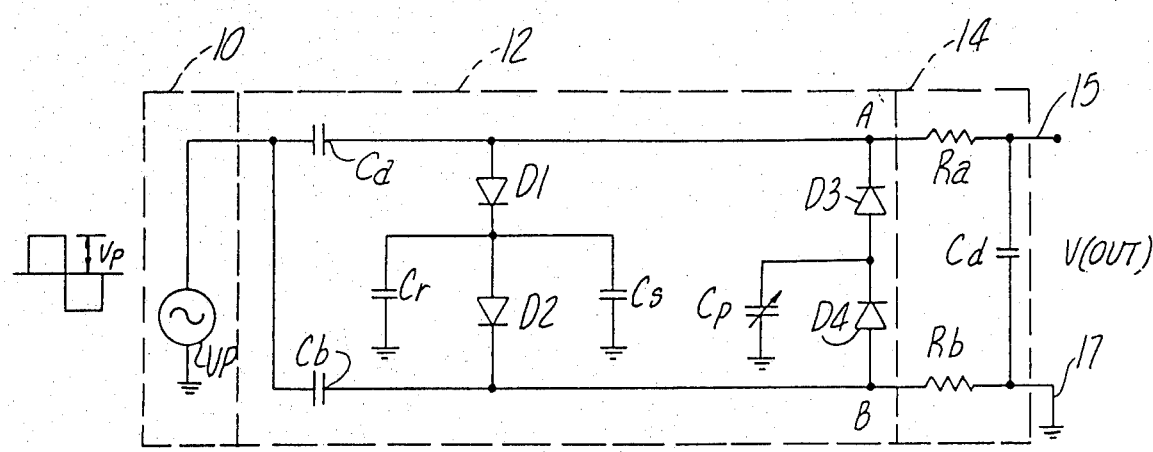
PRIOR ART
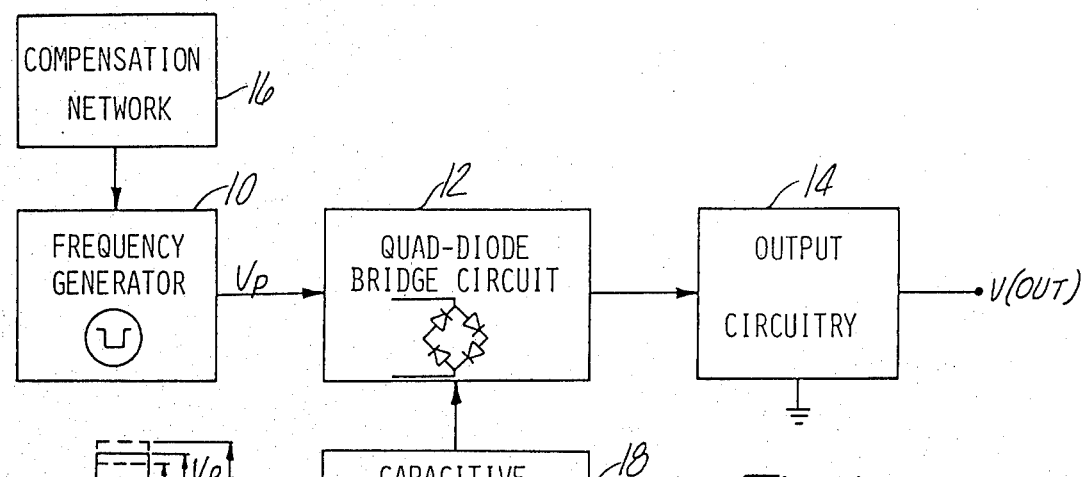
Fig-1
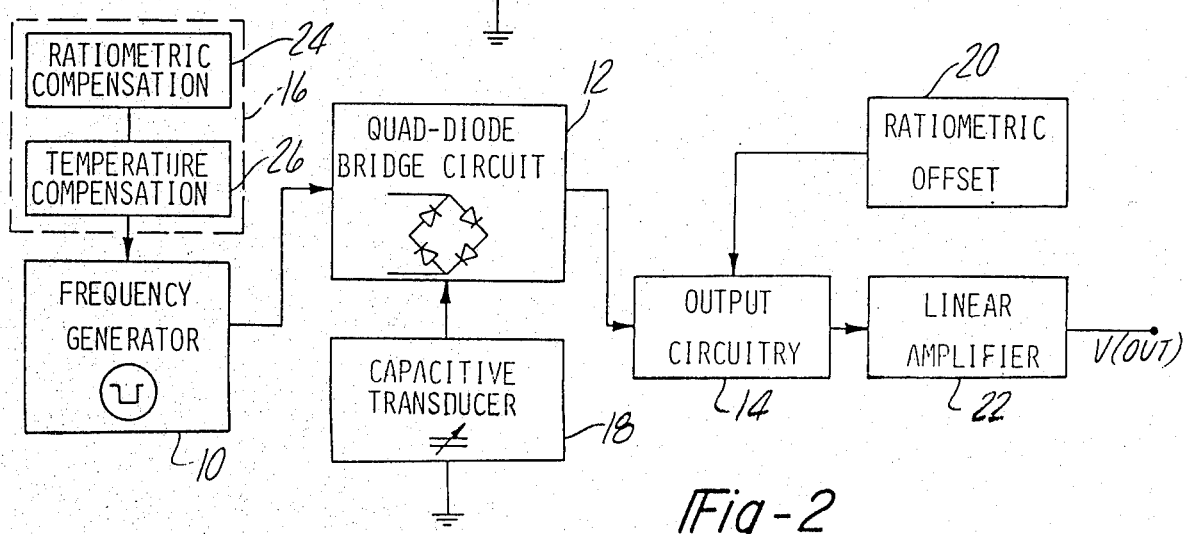
Fig-2

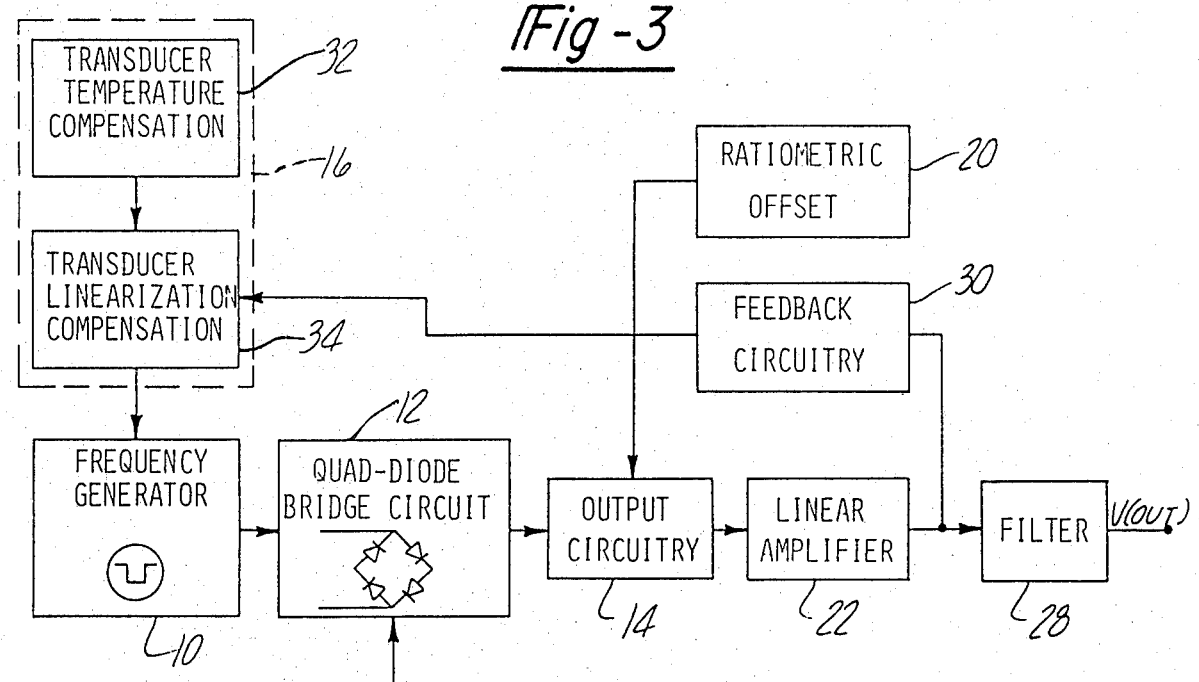
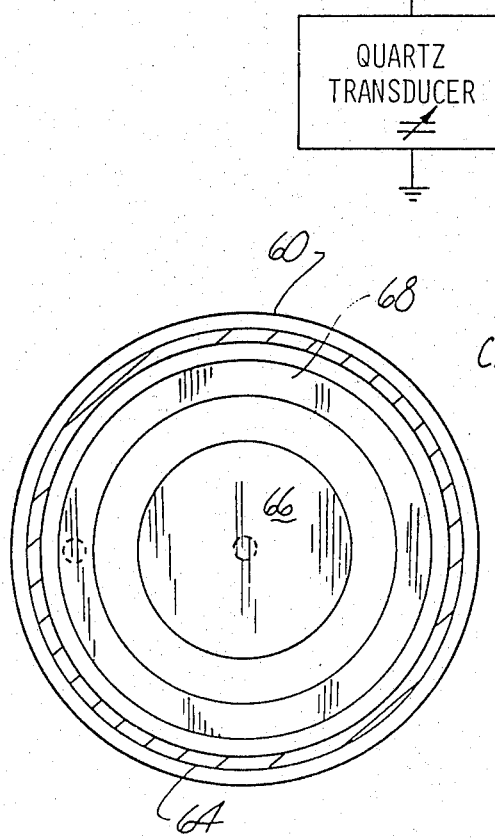
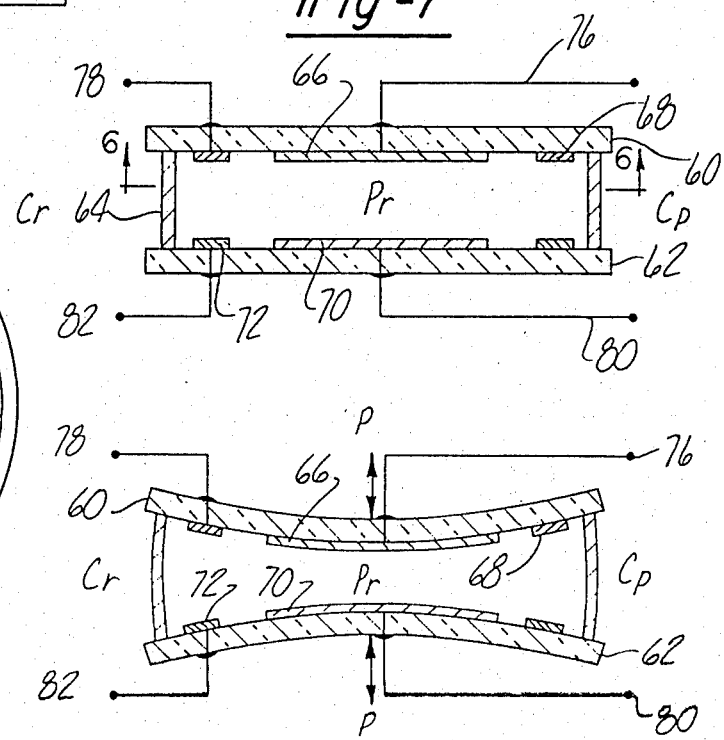

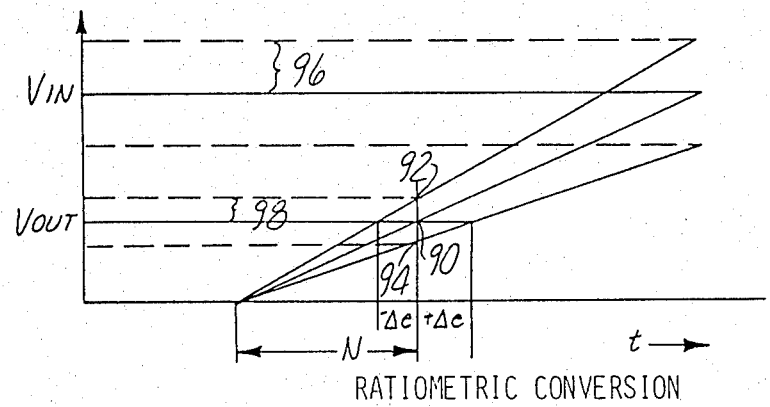
*Fig-9*
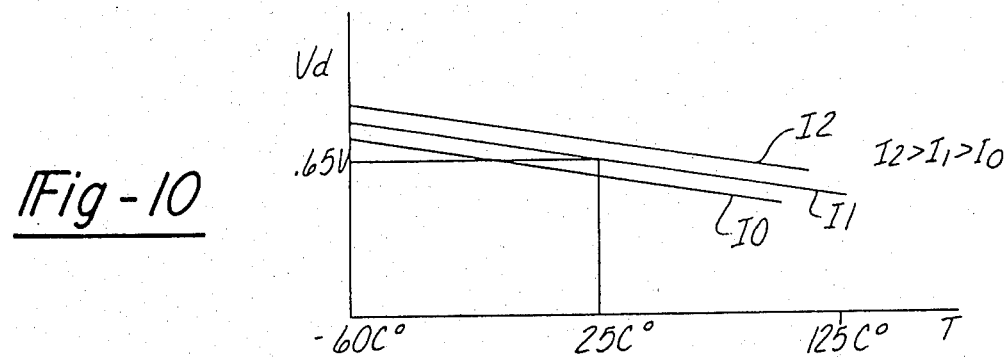
*Fig-10*
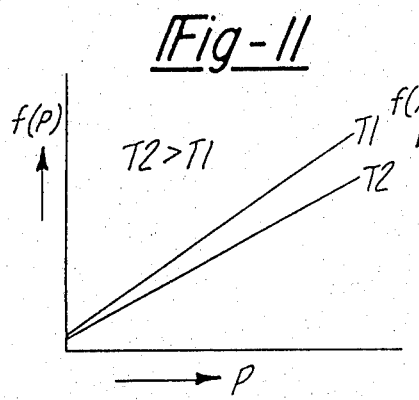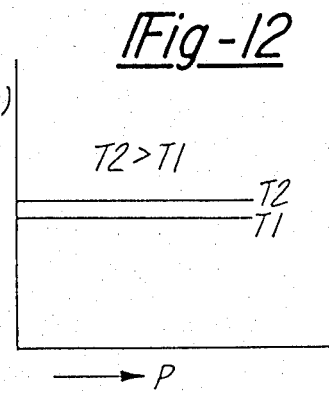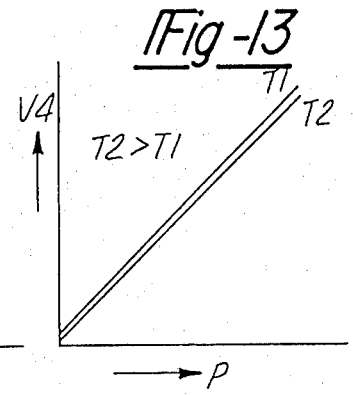
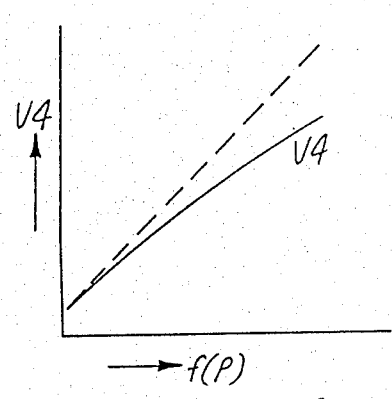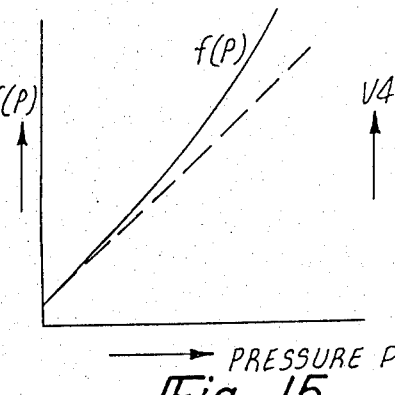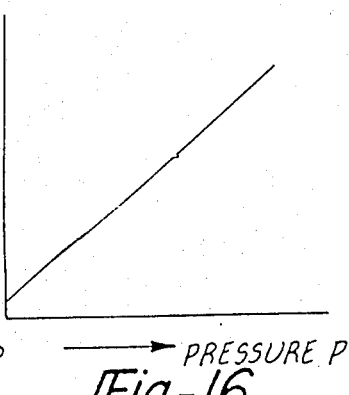

COMPENSATED CAPACITIVE TRANSDUCER DEMODULATOR CIRCUIT

This is a continuation of application Ser. No. 878,056, filed Feb. 15, 1978, now abandoned.

BACKGROUND OF THE INVENTION

1. Field of the Invention

The invention pertains generally to demodulation circuits for transducers and is more particularly directed to compensation circuitry for a quad-diode demodulator and capacitive transducer combination.

2. Prior Art

Capacitive transducers are useful devices for measuring physical parameters such as pressure, distance, surface roughness, angle change or the like and come in an almost limitless variety of shapes, sizes and configurations. A change in the sensed parameter will cause the transducer to vary its capacitance accordingly in a proportional or known functional manner. The change in capacitance of the transducer can thereafter be utilized in a number of ways to generate an electrical signal representative of the change in the physical parameter.

Generally, for capacitive transducers, the generation of the electrical signal is accomplished by the modulation of an alternating carrier frequency where one of the characteristics of the carrier is modified electrically by the variable capacitance of the transducer. The carrier is thereafter detected or demodulated to obtain the intelligence contained and thereby generates a useful electrical signal representative of the sensed parameter. The circuit used for modulating the carrier is usually in integral combination with the demodulator circuit with the whole being termed hereinafter a transducer demodulator.

Particularly, such a transducer demodulator circuit configuration using a quad-diode is shown in U.S. Pat. Nos. 3,318,153; 3,271,669 issued to T. Lode. These circuits are particularly useful for capacitive pressure transducers. Another advantageous type of capacitive transducer demodulator that has been recently developed is the quad-diode bridge circuit. An example of which is illustrated in U.S. Pat. Nos. 3,883,812; 3,869,676 issued to Harrison et al. The desirable characteristics of this demodulator include a sufficient magnitude of output which is relatively independent of excitation waveform and frequency. Additionally, this transducer demodulator provides excellent resolution for the change in capacitance of the transducer and allows the transducer to be conveniently grounded. These are features that will provide for greater use of this circuit in multi-farious transducer applications in the future. These circuits and others of their general type will herein further be termed quad-diode demodulators because of their circuitry utilizing four rectification devices or diodes.

If the capacitive transducer is a pressure transducer, a capacitive transducer and demodulator combination, as described above, can be utilized for sensing manifold absolute pressure (MAP) changes in an internal combustion engine. The electrical signal obtained from the combination can then be used as is conventional to regulate functional aspects of the engine operation such as air/fuel ratio, timing, EGR, etc. when sensed with other engine parameters. In the automotive environment the convenient grounding of a capacitive transducer is an important feature which allows a direct connection to the chassis and eliminates the problems of isolating a transducer with a reference potential that is above or below chassis ground. Also, the referenced Harrison quad-diode circuit lends itself to remote transducer applications which probably will accompany many new developments in automotive electronics.

However, there are still problems with using these quad-diode demodulators in harsh environments such as that found in the engine compartment of an automobile. The range of temperatures through which the transducer-demodulator circuitry is subjected to is extreme (40° F. to 120° F.) and the circuitry must, therefore, be provided with accurate temperature compensation. This problem is complicated by the inclusion of the necessary but non-linear diodes in the demodulator circuitry. These diodes will produce not only different voltage drops for different temperatures but will also produce different voltage drops at the same temperature when different currents are conducted.

Another problem found in many environments but which is particularly troublesome in the automotive environment is the regulation of the power supply. With constantly changing demands on a limited battery and only a rough regulation from the voltage regulator for alternator voltage changes, surges and voltage drops of significant magnitude are not uncommon. Transducer electronics where the information is contained within the amplitude of transducer signal and changes with respect to a reference are particularly affected by these changes.

One method developed for overcoming this problem is ratiometry. This method contemplates that the output of a particular circuit will change in accordance with the changes in the power supply to always remain a predetermined percentage of the power supply for non-signal conditions. Thus, when a plurality of these circuits are connected together signal information will not be lost and errors will not be introduced because of the regulation problems of the power supply. Therefore, when operated in an automotive or other environments where regulation problems are prevalent, the quad-diode demodulator and capacitive transducer combination should be provided with ratiometric compensation for facile connection to other system circuitry. Compensation for ratiometric errors is difficult because of the non-linear nature of the diodes of the demodulator which cause an error.

In certain instances it is just as important to compensate for the transducer itself as it is to compensate the demodulator circuitry. For example, quartz capacitor transducers are relatively accurate and inexpensive but they are temperature sensitive and some have linearity problems for reasonably priced transducers. It would be extremely advantageous to compensate a low cost quartz capacitive transducer to provide a linear output without temperature dependency while retaining the desirable features of a quad-diode demodulator.

SUMMARY OF THE INVENTION

The invention provides a compensation technique for a quad-diode demodulator and capacitive transducer combination. The technique includes controllably varying the amplitude of an alternating carrier frequency oppositely to changes produced in that amplitude by the compensable errors in the demodulator and transducer and thus effecting their cancellation.

The technique produces an extremely flexible compensation method where many different types of errors may be compensated for without drastic modification of the demodulator circuitry. Moreover, compensation may be effected without disturbing the desirable characteristics of the quad-diode demodulator and capacitive transducer combination.

In a first preferred embodiment the technique is implemented by compensation network circuitry comprising means for ratiometric compensation and means for temperature compensation of the quad-diode demodulator. A voltage follower circuit is utilized to compare and maintain the equivalency between a ratiometric voltage and the input voltage of a frequency generator minus a non-linear compensation voltage.

In the first embodiment the compensation voltage is generated as the complement of the non-linear and non-ratiometric error attenuation introduced by the demodulator circuit because of the diodes that comprise the demodulation bridge. The input voltage to the frequency generator is therefore the ratiometric voltage plus the non-linear and non-ratiometric compensation voltage which compensates for the attenuation of the diodes in the demodulator. Since the diode voltage attenuation in the bridge is temperature dependent, the compensation voltage being the complement of the attenuation is also temperature dependent and produces a demodulator output that has the temperature term canceled. The compensation voltage is developed in this embodiment by drawing an exact amount of current through a temperature sensitive means. The temperature sensitive means have a temperature characteristic identical with the temperature characteristic of the demodulator diodes and of equivalent voltage magnitude. Thus, the voltage magnitude of the temperature sensitive means cancels the ratiometric error and changes with temperature to cancel the temperature dependency.

In a second preferred embodiment the technique is implemented by compensation network circuitry comprising means for temperature compensation and means for linearization of a quartz capacitive pressure transducer. A voltage follower circuit is utilized to compare and maintain the equivalency between a ratiometric voltage and the input voltage of a frequency generator minus a non-linear compensation voltage.

In the second embodiment the compensation voltage is generated as the combination of a temperature dependent component and a non-linear component. The temperature dependent component of the compensation voltage is used to compensate for the temperature dependency of the quartz capacitive transducer and the non-linear component for the non-linear response of the transducer.

The temperature dependent component in this embodiment is developed by drawing an exact amount of current through a temperature sensitive means with a substantially linear temperature characteristic. The linear change in voltage with respect to temperature of the device is used as a slope multiplier to cancel the change in the output of the quartz capacitive transducer with respect to temperature. The non-linear component is generated in proportion to the inverted output voltage of the demodulator and transducer combination. The non-linear component is then provided as negative feedback to reduce the input voltage to the frequency generator and cancel the non-linear increases in the quartz capacitive transducer.

Accordingly, it is an object of the invention to provide a non-invasive compensation technique for a quad-diode demodulator and capacitive transducer combination whereby the advantageous characteristics of the combination are not deleteriously affected by the compensation.

It is another object of the invention to provide compensation for the temperature and ratiometric errors introduced into the output of the demodulator and transducer combination by the non-linear diodes of the demodulator bridge.

It is still another object of the invention to provide compensation for the temperature and linearity errors introduced into the output of the demodulator and transducer combination by a quartz capacitive transducer.

These and other objects, features, and aspects of the invention will be more fully understood and better appreciated from a reading of the following detailed disclosure taken in conjunction with the appended drawings wherein:

BRIEF DESCRIPTION OF THE DRAWINGS

The prior art figure is a schematic view of a quad-diode demodulator circuit and capacitive transducer combination;

FIG. 1 is a block diagram of a quad-diode demodulator circuit and capacitive transducer combination provided with a compensation network according to the invention;

FIG. 2 is a detailed block diagram illustrating the quad-diode demodulator and capacitive transducer combination shown in FIG. 1, and provided with ratiometric and temperature compensation for the quad-diode demodulator;

FIG. 3 is a detailed block diagram illustrating the quad-diode demodulator and capacitive transducer combination shown in FIG. 1, and provided with temperature compensation and linearization compensation for a quartz capacitive transducer;

FIG. 6 is a cross sectional view of a quartz capacitive pressure transducer taken along section line 6 in FIG. 7;

FIG. 7 is a cross sectional side view of a quartz capacitive pressure transducer in a quiescent state;

FIG. 8 is a cross sectional side view of the quartz capacitive pressure transducer in a state of flexure;

FIG. 9 is an illustrative graphic diagram of a ratiometric conversion;

FIG. 10 is an illustrative graphic diagram of temperature versus the voltage across a signal diode for different current levels; and FIGS. 11 through 16 are graphic illustrations of functional relations at various points throughout the circuitry of FIG. 5.

The convention that like reference numeral refer to identical elements throughout the figures has been maintained for facilitating a clear description of the invention.

DETAILED DESCRIPTION OF THE PREFERRED EMBODIMENTS

Figure 4:
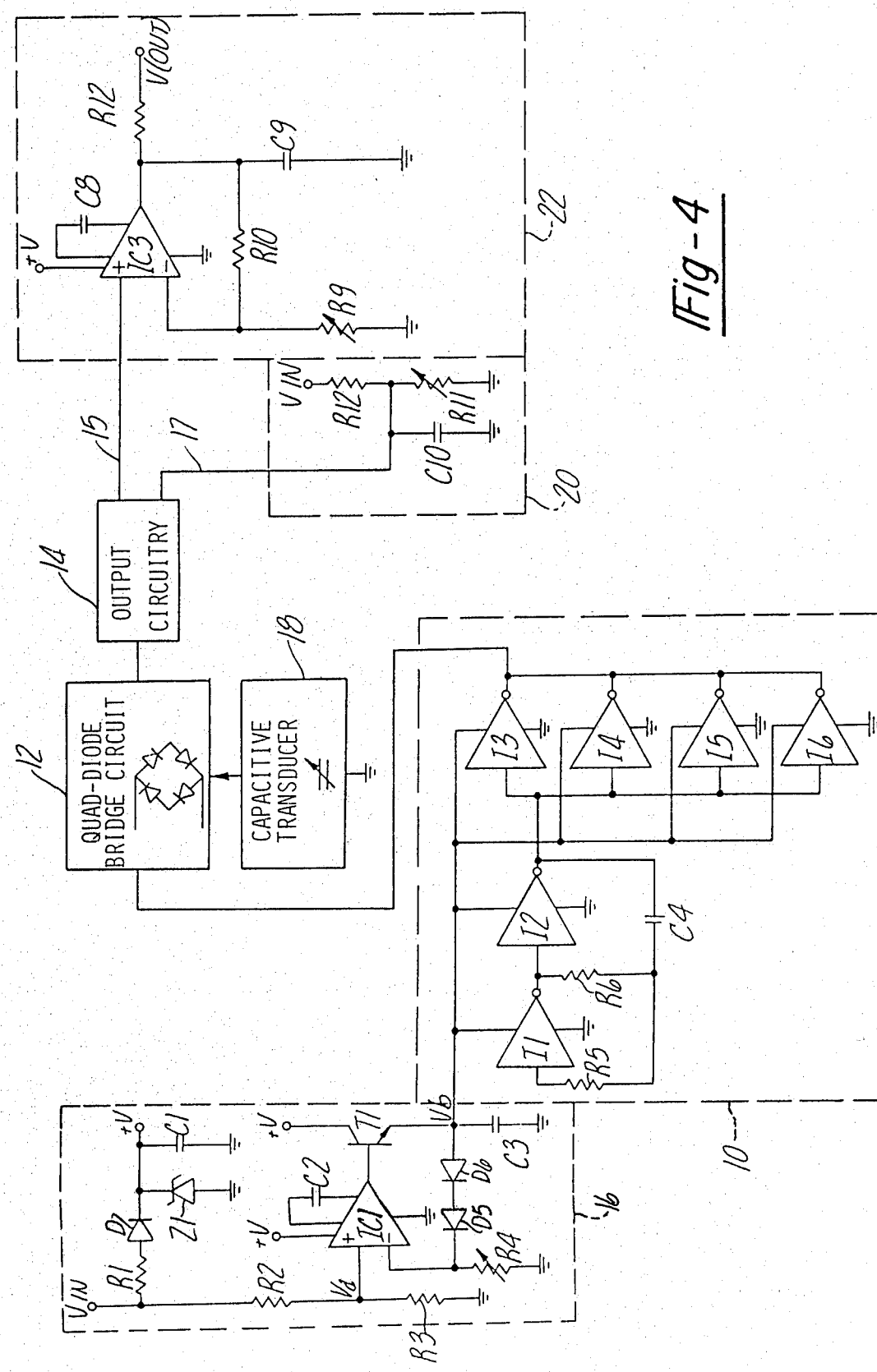
FIG. 4 is a detailed schematic circuit of the block diagram illustrated in FIG. 2.

Illustrated in the prior art figure is a quad-diode demodulator for the detection of capacitive changes in a transducer caused by the variance of a physical parameter. The demodulator comprises generally a frequency generator 10, a quad-diode bridge circuit 12, and an output circuit 14. The frequency generator 10 produces an alternating carrier frequency of an amplitude $V_p$ to the junction of two coupling capacitors $C_a$ and $C_b$ of the bridge circuit 12. The other terminals of the coupling capacitors $C_a$ and $C_b$ are connected respectively between first and second diode bridge nodes formed by diodes D1, D3 and diodes D2 and D4, and ground. The diodes D1, D2, D3, and D4 form a quad-diode bridge and have parallel capacitors $C_r$, $C_s$ connected between a third bridge node formed by the diodes D1, D2, and ground. A fourth bridge node formed by the diodes D3, D4, has a capacitor $C_p$ connected between the node and ground.

Conventionally, $C_p$ is representative of the variable capacitance of a capacitive transducer and $C_r$ is a capacitance of a value that is equivalent to the zero point value of the capacitive transducer. The capacitance $C_r$ may be contained within the transducer for compensation or may be supplied externally. The capacitor $C_s$ is provided as a small variable capacitor in parallel with $C_r$ to enable exact zeroing of the initial output of the capacitive transducer. The total capacitance $C_s$ and $C_r$ is substantially equivalent to $C_r$ and this value will be used for further description when referring to these in combination.

Consider now one half of the circuit where values of $C_a$, $C_b$ are much, much greater than $C_p$, $C_r$. Assuming $C_a$ is charged, on positive transitions of the frequency generator 10, the diode D1 conducts and $C_r$ charges to a voltage dependent upon the value of $C_r$ since $C_a >> C_r$. $C_a$ therefore discharges by an amount of charge dependent upon the value of $C_r$. Subsequently, on negative transitions, diode D3 conducts and the capacitor $C_p$ charges an amount determined by the value of $C_p$ since $C_a >> C_p$ and $C_a$ charges by an equivalent amount. If the capacitors $C_p$ and $C_r$ are equal, then there is no net signal voltage left on $C_a$. However, if $C_p$ changes as the result of sensing a change in a physical parameter, then a net DC voltage or charge will remain on capacitor $C_a$ and appear as a signal output at point A. The signal voltage developed is a function of the difference of the values of capacitors $C_p$ and $C_r$.

In a similar manner, diodes D2, D4 in cooperation with capacitors $C_r$ and $C_p$ will produce a net DC voltage at point B. This voltage will be equivalent to the voltage at point A but of opposite polarity. At a steady state condition, equal amounts of charge are transferred between $C_p$ and $C_r$ and the voltage output from the demodulator will reduce to $$Vdc = 2(V_p - V_d)(C_p - C_r)/C_p + C_r \quad (1)$$

where Vdc is the output voltage measured across points AB, $V_p$ is the voltage amplitude of the frequency generator, and $V_d$ is the voltage drop across one of the diodes D1–D4.

The output circuitry 14, comprising an impedance $R_a$ connected between point A and an output terminal 15 and an impedance $R_b$ connected between point B and a ground terminal 17, provides a single ended output from the differential voltages presented at points A and B respectively. A capacitor $C_d$ is provided by connecting one lead to the terminal 15 and the other lead to terminal 17 for coacting with the impedances $R_a$, $R_b$. This demodulator circuit is more fully described in the two before referenced U.S. patents issued to Harrison, the disclosure of which is expressly incorporated herein by reference.

With attention now directed to FIG. 1, there is shown to advantage in block form a preferred quad-diode demodulator circuit including a frequency generator 10, quad-diode bridge circuit 12, output circuit 14, and capacitive transducer 18, the function and operation of which are identical to that described in the above prior art figure. In accordance with the invention, a compensation network 16 is connected to the frequency generator 10 for providing a controllable amplitude for the carrier frequency $V_p$ to cancel a compensable error from the demodulator-transducer combination.

In theory, the output voltage of the demodulator and transducer combination can be written as a transfer function:

$$V_{out}/V_p = G(s) \quad (2)$$

where $V_{out}$ is the output amplitude of the voltage at terminals 15, 17, $V_p$ is the voltage amplitude of the frequency generator 10, and $G(s)$ is the impedance transfer function of the demodulator and transducer combination.

The impedance transfer function for the particular circuit illustrated is a function of a number of independent variables including but not limited to temperature, frequency, capacitance, and the linear response of the elements at different current levels. Each of these variables, as they change, will vary V(out) for a constant $V_p$ input according to their particular characteristics. These changes can be non-linear and either attenuations or amplifications. Ideally, however, V(out) for this combination should only change with the variable capacitance of the transducer and then linearly with the physical variable producing the change. The remaining variables will produce compensable errors in the output. The compensation network 16 will then vary the amplitude $V_p$, either by increasing or decreasing the level to substantially cancel changes in the V(out) amplitude not due to linear capacitance changes in the transducer.

In one preferred embodiment, as illustrated in FIG. 2, the compensation network 16 includes circuitry comprising a ratiometric compensation network 24 in combination with a temperature compensation network 26 for the quad-diode demodulator. Further included in this particular embodiment is a linear amplifier 22 connected to the output circuitry 14. A ratiometric offset circuit 20 provides a level change for the output circuitry 14 as will be more fully explained hereinafter.

From examination of equation (1) it is seen that the contribution of the diode drop $V_d$ will cause the need for compensation in the demodulator circuit. As shown in FIG. 10, the voltage drop $V_d$ in the equation (1) is not only dependent upon temperature but is further a function of the current drawn through the device. Generally, as seen in the graphical representation, larger temperatures will cause a decrease in the voltage characteristic and increasing currents will produce a larger voltage drop. For a normal signal diode as normally used in such a demodulator circuit such changes will cause a shifting voltage change between 0.1–0.15 V in a voltage drop from a turn on point of approximately 0.6 V to 0.75 V at full current.

This shifting voltage drop of the diode, however, may be still fairly constant with respect to the substantially larger change in $V_p$ caused by an unregulated automotive power supply. This relatively constant drop of the diode can, therefore, cause a significant ratiometric error in the output voltage as it is not ratiometric itself. This non-ratiometry cannot be tolerated in certain environments where the analog output of the demodulator and transducer combination is changed to a digital number by a ratiometric conversion as illustrated in FIG. 9.

Normally, this technique envisions a slope generator that provides a constantly rising ramp whose voltage is compared to the output voltage V(out) of the demodulator transducer combination. The counter begins a count when the ramp is started and when a comparison indicates the equivalency of the ramp voltage and the output voltage at 90 the counter is halted containing a digital representation, N, of the analog voltage. For changes in the power supply $V_{in}$, the ramp is changed accordingly, and if the transducer output is ratiometric no error in the output count will appear. For higher voltages at point 92, the number N will still be obtained and at lower voltages at point 94 no error will be introduced. However, if the output voltage V(out) remains constant or does not change ratiometrically, the error $-\Delta e$ or $+\Delta e$ will result. The sensitivity of the transducer and demodulator combination will be effectively nullified by the ratiometric error introduced. It is known that in an automotive supply of approximately 10 V a diode drop of 0.65 V that is not ratiometric will introduce a percentage error in the order of 1.2%.

FIG. 4 illustrates circuitry advantageously compensating the demodulator and transducer combination for the temperature and current characteristics of the diodes in the bridge circuit and further eliminating the ratiometric error of the circuit. The compensation network circuit 16 comprises a voltage follower amplifier IC1 connected between a positive source of voltage, $+V$, and ground. The positive source $+V$ is obtained from regulating a source $V_{in}$ which can be for example an automotive power supply. The regulation circuit is provided by serially connecting $V_{in}$ to a terminal of a load resistor R1 and thereafter the other terminal to the anode of a steering diode D which is connected at its cathode to the $+V$ terminal. Shunt regulation is produced at the $+V$ terminal by Zener diode Z1 and filter capacitor C1 connected in parallel between the $+V$ terminal and ground.

$V_a$ ratiometric voltage A is applied to the noninverting input of the amplifier IC1 via the junction of the serial combination of a divider resistor R2 and a divider resistor R3 connected between the supply $V_{in}$ and ground. For every change in the supply $V_{in}$, the divider point voltage $V_a$ will change in a ratiometric manner.

A compensation voltage is developed at the inverting input to the amplifier IC1 by the negative feedback of a serial pair of diodes D5, D6 connected between the emitter of a power transistor T1 and the inverting input. A variable resistor R4 is also connected between the inverting input of the amplifier IC1 and ground for varying the amount of current drawn through the diode pair. Diodes D5, D6 should be matched to the quad-bridge diodes and R4 adjusted to pull equivalent current through the compensation diodes. The power transistor T1 which is controlled by its connection to the output of amplifier IC1 at its base provides a controllable amount of current to a filter capacitor C3 attached between the emitter of the transistor and ground. The collector of the power transistor T1 is connected to the regulated positive supply $+V$.

In operation, the compensation network 16 produces a voltage $V_a$ at the non-inverting input to amplifier IC1 which the circuit will attempt to balance at the inverting input through the action of the power transistor T1 and the feedback through diodes D5, D6. An increase in voltage at point $V_a$ will increase the voltage at point $V_b$ and the inverting input until it exceeds the voltage at point $V_a$. The transistor T1 will then reduce the voltage at the inverting input until equivalence is reached. The filter capacitor C3 will delay the changes and damp out any oscillations and produce filtering for the voltage at point $V_b$. Thus, the voltage at point $V_b$ is two diode voltage drops, 2 $V_d$, above the ratiometric voltage at point $V_a$. Thus, $$V_b = V_a + 2V_d \qquad (3)$$

and if the peak to peak voltage, 2 $V_p$, of the frequency generator 10 is set equivalent to $V_b$, then $$V_p = \tfrac{1}{2} V_b$$

or $$V_p = \tfrac{1}{2} V_a + V_d \qquad (4)$$

then substituting equation (4) into equation (1)

$$V_{dc} = V_a(C_p - C_r)/(C_p + C_r) \qquad (5)$$

where $V_a$ is ratiometric and the diode effects have been eliminated.

The voltage $V_b$ is used as the power supply or peak to peak voltage of the frequency generator 10 by connecting the emitter of transistor T1 to the power supply pins of inverters I1–I6 and grounding their reference supply pins. The output of inverter I2 is connected via feedback capacitor C4 and variable resistor R5 to the input of the inverter I1 in a conventional manner to form a free-running astable oscillator whose frequency is determined by the RC time constant of R5, C4. Further, feedback is provided by the connection of a feedback resistor R6 to the input of inverter I2 and to the junction of the resistor R5 and capacitor C4. The frequency should be adjusted such that the circuit will not be sensitive to the frequency used. Preferably for the Harrison demodulator circuit this is in the range of 200–300 KHZ.

The output of the oscillator formed by inverters I1, I2 is transmitted from the output of the inverter I2 to the commonly connected inputs of the inverters I3–I6. The output of the inverters I3–I6 are commonly connected together to generate the output of the frequency generator 10. The inverters I3–I6 act as buffer amplifiers for the output of the oscillator and do not permit the output voltage to change for differences in the demodulator load.

The ratiometric offset circuit 20 includes a voltage divider comprising the serial combination of a divider resistor R12 and a variable divider resistor R11 connected between the supply $V_{in}$ and ground. A high frequency filter capacitor C10 is connected at the junction of the resistors to provide decoupling from any power supply transients or feedback. In operation, the resistor R11 is adjusted such that any capacitive transducer will produce a zero output for initial conditions of the physical operating parameter that is to be measured. The offset preserves the ratiometry developed in the circuit by voltage $V_a$.

Linear amplifications of the demodulator output terminal 15 can be accomplished by amplifier IC3 which is connected as a conventional non-inverting voltage amplifier. The power supply pins of IC3 are connected to the regulated source +V and ground, and a frequency compensation capacitor C8 is provided normally as is known.

The non-inverting input, receiving the single ended output of the demodulator via terminal 15, amplifies the voltage by a variable gain and generates V(out) over resistor R12 from the output of amplifier IC3. The variable gain is provided by adjusting a variable resistor R9 connected between the inverting input and ground in relation to a fixed resistor R10 connected between the output and inverting input of the amplifier IC3. A filter capacitor C9 is provided between ground and the output of amplifier IC3 to attenuate any high frequency noise.

In another preferred embodiment, a quartz capacitive transducer is compensated for linearization and temperature errors by the compensation network 16 illustrated in the block diagram of FIG. 3. The demodulator circuit includes, as described above, a frequency generator 10, quad-diode bridge circuit 12, and output circuitry 14. Connected to the reference terminal of the output circuitry is a ratiometric offset 20 as previously described with reference to FIG. 2. A linear amplifier 22 can be used to provide gain for the output voltage of the output circuitry 14 and a low pass filter 28 receives the output of the amplifier 22 to attenuate high frequency noise or spikes in the output voltage of the circuit, V(out).

The compensation network 16 includes in combination a transducer temperature compensation circuit 32 and a transducer linearization circuit 34 which provide a controllable voltage $V_p$ to the frequency generator 10 to cancel the errors of the demodulator and transducer combination. A feedback circuit 30 is provided to cycle a portion of the output voltage of amplifier 22 into the transducer linearization circuit 34 as a measure of the amount of linearization needed.

Figure 5:
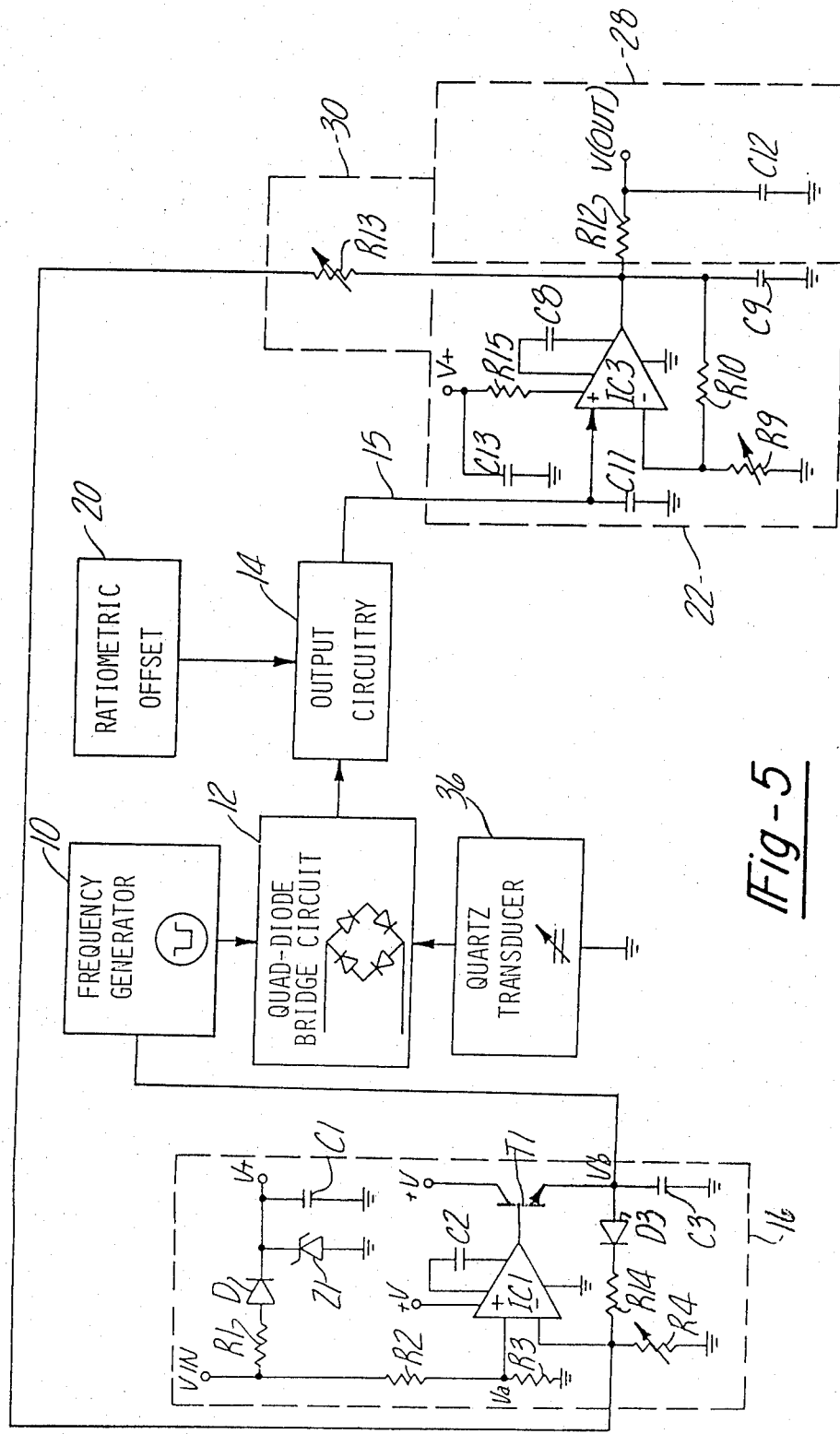
FIG. 5 is a detailed schematic circuit of the block diagram illustrated in FIG. 3.

Detailed circuitry for the implementation of the block diagram of FIG. 3 is illustrated in FIG. 5. The compensation network 16 is implemented in a similar fashion to the detailed circuit for block 16 in FIG. 4 with the substitution of resistor R14 for diode D5 in the feedback loop between the emitter of transistor T1 and the inverting input of the amplifier IC1. Further, a variable resistor R13 comprising the feedback circuitry of block 30 is connected between the output of the amplifier IC3 and the inverting input the amplifier IC1 to complete the implementation of the block 16 of this particular embodiment. Circuit blocks 10, 12, 14 and 20 of FIG. 5 comprise identical circuitry as that described in the similar numbered blocks of FIG. 4 and will not be further described.

Further, the block 22 comprising the circuitry for the linear amplifier is similar to that described in FIG. 4 but with the addition of a decoupling resistor R15 connected between the positive supply +V and the power supply pin of the amplifier IC3. High frequency decoupling capacitors C13 and C11 have also been added to the circuit. The capacitor C13 is connected between ground and the positive power supply pin of amplifier IC3 while capacitor C11 is connected between the non-inverting input to amplifier IC3 and ground.

The low pass filter 28 can be formed in a conventional manner by the serial connection of a load resistor R12 and a capacitor C12 between the output of amplifier IC3 and ground. The output terminal voltage V(out) is then generated from the junction formed at the resistor R12 and the capacitor C12.

FIGS. 6, 7, and 8 illustrate in a preferred form for the quartz capacitive transducer schematically shown in block 36 of FIG. 5. The transducer 36, shown as a pressure transducer, comprises two opposing discs 60, 62 or plates of quartz or other vitreous material with similar characteristics. On the face of each disc, for example, disc 60, there is formed two capacitor plates 66, 68 of some conductive metal by a screening or vapor deposition process or the like. After formation of the plates 66, 68, 70, 72 on the discs 60, 62 respectively, the discs are joined to form a gap between the plates by an annular frit 64 and the interior of the transducer evacuated or set at a reference pressure $P_r$.

As seen in FIG. 8, a change in pressure P will cause a deformation of the discs 60, 62 and vary the gap distance between the plates of a pressure capacitor $C_p$ which can be detected via the terminals 76, 80. Normally, a reference capacitor, $C_r$, which can be detected via terminal 78, 82 does not change capacitance appreciably and can be used for reference compensation in the demodulator circuit for the capacitor $C_p$. A capacitor of this type is more fully disclosed in a commonly assigned U.S. Pat. No. 3,858,097 issued to Polye, the disclosure of which is hereby expressly incorporated by reference.

The operation of the circuit illustrated in FIG. 5 in combination with the quartz capacitive transducer will now be more fully explained. With respect to thermal sensitivity compensation, the compensation network 16 utilizes the temperature characteristic of the diode D6 to provide the needed correction. For the circuitry shown in FIG. 5 and assuming for a moment that R13 approaches infinity, $$V_b = V_a + V_d + V_{r14} \tag{6}$$

where $V_{r14}$ is the voltage across the resistor R14 and $V_d$ is the diode voltage across D6 now, by OHM's law $$V_{r14} = (V_b - V_d)R14/(R4 + R14) \tag{7}$$

or substituting equations (6) and (7) in equation (1) and reducing $$V(out) = A(f(x)f(p) + V_c) \tag{8}$$

where
$$f(x) = V_a(1 + R14/R4) - V_d \tag{9}$$

$$f(p) = (C_p - C_r)/(C_p + C_r) \tag{10}$$

$V_c$ = offset voltage, and
A = linear amplifier gain

If one now inspects equation (9) and its graph in FIG. 12, the change in f(x) will be due only to temperature because of the $-V_d$ term. For a diode the voltage drop decreases with increasing temperature and hence the subtraction of the $V_d$ term will cause an increasing f(x) from temperature $T_1$ to temperature $T_2$ where $T_2$ is greater than $T_1$.

Graph 11 illustrates the uncompensated f(p) due to thermally sensitivity of the quartz capacitive transducer. It is seen that the function f(p) has a lower slope for increasing temperatures where $T_2$ is greater than $T_1$. From equation (8) it is seen that the function f(x) acts as a slope multiplier to the function f(p) but in the opposite direction and thus will increase the slope of the higher temperature curve at $T_2$ in FIG. 11. The result is illustrated in FIG. 13 in which the curves are separated only by the thermal shift in their zero points. The correct multiplication constant can be obtained by adjusting the current drawn through diode D6 via variable resistor R4.

The linearity compensation of the circuit of FIG. 5 will now be more fully described. Generally, the quartz capacitive transducer illustrated will not generate a linear change in output for a change in physical output variable. FIG. 15 shows that the function f(p) based on the capacitance change of the transducer will follow more of a square law with respect to changes in pressure than a linear function as represented by the dotted line in the figure. Normally, such a response is caused by the change in pressure causing a relatively representative change in the spacing between the capacitor discs. However, capacitance for a parallel plate configuration as shown changes inversely with the square of the distance and not linearly. The compensation technique causes $V_b$ to change such that V(out) will be compensated as illustrated in FIG. 14 and thus cancel the non-linearity of the transducer. The resultant linear output is illustrated in FIG. 16 where V(out) is graphically indicated as a first order function of the variable p after combining the compensation and nonlinear response of the transducer.

This can be illustrated by writing the circuit transfer function as follows below. Recalling equation (8) and rewriting it for R13 not equal to infinity.

$$V(\text{out}) = \frac{A(f_1(x) f(p) + V_c)}{1 + A \frac{R14}{R13} f(p)} \quad (11)$$

where $$f_1(x) = V_a(1 + R14/R4 + R14/R13) - V_d \quad (12)$$

Then for $f_1(x)$ much greater than R14/R13, V(out) will be an increasing function that follows the numerator of equation (11) and f(p). The denominator, however, contains a linearizing term A(R14/R15) f(p) which tends to decrease V(out) for increases in f(p) and can be adjusted controllably by varying R13. Thus, a simple adjustment may be made to linearize a quartz capacitive transducer that normally does not have a first order output function.

While preferred embodiments of the invention have been described, it will be obvious to those skilled in the art that various modifications and changes may be made without departing from the spirit and scope of the invention as is set forth in the following claims.

What is claimed is:

1. A capacitive transducer and demodulator combination circuit comprising:
   a capacitive transducer for measuring the variances of a physical parameter, said transducer adapted to transform the variances into changes of capacitance of the transducer;
   a frequency generator means for supplying an alternating carrier voltage;
   a quad-diode demodulator electrically connected to receive from said frequency generator means the alternating carrier voltage and further connected to said transducer such that the changes in capacitance modulate said carrier, said demodulator detecting said carrier and generating an output voltage signal representative of the variances in the measured physical parameter; and
   compensation network means, electrically connected to said frequency generator, for varying the amplitude of the carrier voltage oppositely to the amplitude changes in the output signal produced by the compensable errors of the demodulator and transducer.

2. A capacitive transducer and demodulator combination circuit as defined in claim 1 wherein said compensation network means includes:
   means for providing ratiometric compensation for the ratiometric error of said quad-diode demodulator.

3. A capacitive transducer and demodulator combination circuit as defined in claim 2 wherein said compensation network means includes:
   means for providing temperature compensation for the temperature error of said quad-diode demodulator.

4. A capacitive transducer and demodulator combination circuit as defined in claim 3 which further includes:
   ratiometric offset means for adjusting the zero point of said capacitive transducer with a ratiometric voltage.

5. A capacitive transducer and demodulator combination circuit as defined in claim 4 which further includes:
   amplification means for the linear amplification of the output voltage signal of the demodulator.

6. A capacitive transducer and demodulator combination circuit as defined in claim 1 wherein said compensation network means includes:
   voltage follower means for generating the power supply voltage of said frequency generator means where said power supply voltage is generated as the algebraic combination of an input supply voltage and a compensation voltage, said power supply voltage increasing or decreasing in response to changes in said compensation voltage.

7. A capacitive transducer and demodulator combination circuit as defined in claim 6 wherein said voltage follower means includes:
   a differential amplifier with an inverting input and non-inverting input further having an output terminal connected to the control terminal of a variable impedance device, said impedance device connected between a reference supply voltage and a power supply node of said frequency generator; said amplifier having the input supply voltage connected to said non-inverting input and the variable compensation voltage developed by feedback circuitry connected between the power supply node and the inverting input of said amplifier; said impedance device controlled by the output of said differential amplifier to change the voltage at the power supply node in response to the amplifier balancing the non-inverting and inverting inputs.

8. A capacitive transducer and demodulator combination circuit as defined in claim 7 wherein said feedback circuitry includes:
   a pair of first and second signal diodes with characteristic response curves substantially identical to the diodes of said demodulator; the anode of the first diode connected to the power supply node and the cathode of the first diode connected to the anode of the second diode which has its cathode connected to the inverting input of said amplifier; and a variable resistance connected between the inverting input and ground for adjusting the current flow through the diodes.

9. A capacitive transducer and demodulator combination circuit as defined in claim 8 wherein:
said input supply voltage is developed as a ratiometric voltage in reference to a relatively unregulated supply voltage.

10. A capacitive transducer and demodulator combination circuit as defined in claim 1 wherein said capacitive transducer is a quartz capacitive pressure transducer.

11. A capacitive transducer and demodulator combination circuit defined in claim 10 wherein said compensation network includes:
means for providing temperature compensation for the temperature error of said quartz capacitive transducer.

12. A capacitive transducer and demodulator combination circuit as defined in claim 11 wherein said compensation network includes:
means for providing linearization compensation for the linearity error of said quartz capacitive transducer.

13. A capacitive transducer and demodulator combination circuit as defined in claim 12 which includes:
ratiometric offset means for adjusting the zero point of said quartz capacitive transducer with a ratiometric voltage.

14. A capacitive transducer and demodulator combination circuit as defined in claim 13 which includes:
amplification means for the linear amplification of the output voltage signal of the demodulator.

15. A capacitive transducer and demodulator combination circuit as defined in claim 14 which includes:
filter means electrically connected to the output of said amplification means for providing high frequency and noise attenuation to the amplified output voltage of said demodulator.

16. A capacitive transducer and demodulator combination circuit comprising:
a capacitive transducer for measuring the variances of a physical parameter and for transforming the variances into changes in capacitance of the transducer, wherein said transducer has a variable capacitor $C_p$ which changes capacitance with respect to the physical variable and a reference capacitor $C_r$ which is substantially unchanging with respect to the physical parameter;
a quad-diode demodulator electrically connected to the capacitive transducer and electrically connected to a frequency generator means for supplying an alternating carrier voltage such that the carrier voltage is modulated and detected to generate an output voltage signal representative of the variances in the measured physical parameter, said demodulator having a voltage transfer function of:

$$V_{dc} = 2(V_p - V_d)(C_p - C_r)/(C_p + C_r)$$

where $V_{dc}$ is said output voltage signal, $V_p$ is the voltage amplitude of said alternating carrier voltage, and $V_d$ is the voltage drop across one of the diodes of said demodulator; and
compensation network means, electrically connected to said frequency generator, for varying the amplitude of the carrier voltage oppositely to the amplitude changes in the output signal produced by the compensable errors of the demodulator and transducer.

17. A capacitive transducer and demodulator combination circuit as set forth in claim 16 wherein:
said compensation network means is connected to the power supply of said frequency generator means and provides a supply voltage $V_b$ which is given by the function:

$$V_b = V_a + 2V_d$$

where $V_b$ is the peak-to-peak amplitude of the frequency, generator carrier voltage and $2V_p$, $V_a$ is the voltage of a reference supply, and $V_d$ is equivalent to the voltage drop across one of the diodes of said demodulator; said term $2V_d$ cancelling an identical term in the voltage transfer function of the demodulator to compensate for the varying characteristics with respect to temperature of the diodes of said demodulator.

18. A capacitive transducer and demodulator combination circuit as set forth in claim 17 wherein:
said reference supply voltage $V_a$ is a ratiometric function of an input supply voltage $V_{in}$ and said term $2V_d$ cancels an identical term in the voltage transfer function of the demodulator to compensate for the ratiometric error of the combination circuit caused by the diodes of said demodulator.

19. A capacitive transducer and demodulator combination circuit as set forth in claim 18 further including:
ratiometric offset means for adjusting the zero point of said capacitive transducer with a ratiometric voltage which is a function of $V_{in}$.

20. A transducer and demodulator combination circuit comprising:
a transducer for measuring the variances of a physical parameter, said transducer adapted to transform the variances into changes of impendance of the transducer;
a frequency generator means for supplying an alternating carrier voltage which is a ratiometric function of an input supply voltage;
a demodulator electrically connected to receive from said frequency generator means the alternating carrier voltage and further connected to said transducer such that the changes in impedance modulate said carrier, said demodulator detecting said carrier and generating an output voltage signal representative of the variances in the measured physical parameter; and
compensation network means for varying the amplitude of the carrier voltage oppositely to the amplitude changes in the output signal produced by the compensable errors of the demodulator and transducer wherein said compensation network means includes means for providing ratiometric compensation for the ratiometric error of said demodulator.

21. A transducer and demodulator combination circuit comprising:
a transducer for measuring the variances of a physical parameter, said transducer adapted to transform the variances into changes of impedance of the transducer;
a frequency generator means for supplying an alternating carrier voltage;
a quad-diode demodulator having a voltage transfer function relatively independent of carrier waveform and frequency electrically connected to receive from said frequency generator means the alternating carrier voltage and further connected to said transducer such that the changes in impedance modulate said carrier, said demodulator detecting said carrier and generating an output voltage signal representative of the variances in the measured physical parameter; and compensation network means, electrically connected to said frequency generator, for varying the amplitude of the carrier voltage oppositely to the amplitude changes in the output signal produced by the compensable errors of the demodulator and transducer.

* * * * *